United States Patent [19]

Stark et al.

[11] Patent Number: 4,915,201
[45] Date of Patent: Apr. 10, 1990

[54] PLASTIC CAGE FOR USE IN OVERRUNNING ROLLER CLUTCHES

[75] Inventors: Johann Stark, Höchstadt; Leo Müntnich, Aurachtal, both of Fed. Rep. of Germany

[73] Assignee: INA Walzlager Schaeffler KG, Fed. Rep. of Germany

[21] Appl. No.: 772,640

[22] Filed: Sep. 5, 1985

[30] Foreign Application Priority Data

Sep. 20, 1984 [DE] Fed. Rep. of Germany ....... 3434499

[51] Int. Cl.⁴ .............................................. F16D 15/00
[52] U.S. Cl. .................................... 192/45; 188/82.84
[58] Field of Search ....................... 192/45; 188/82.84

[56] References Cited

U.S. PATENT DOCUMENTS 3,339,687  9/1967  Cowles ................................ 192/45
3,917,036  11/1975  Johnson et al. .............. 188/82.84 X
3,937,312  2/1976  Gehrke ................................. 192/45

Primary Examiner—Carl D. Friedman
Attorney, Agent, or Firm—Bierman and Musserlian

[57] ABSTRACT

A one-piece synthetic plastic cage for retention of clamping rollers in an overrunning roller clutch has two spaced-apart coaxial rims, axially parallel bars extending between the rims and defining roller pockets, and a discrete leaf spring for each bar. The springs are integral with one of the rims and are located radially outwardly of the corresponding bars so that they can bypass such bars by moving in the circumferential direction of the rims. One leg of each spring is integral with the one rim, and the other leg is integral with the one leg and has a free end which bears against the clamping roller in the corresponding pocket.

4 Claims, 1 Drawing Sheet

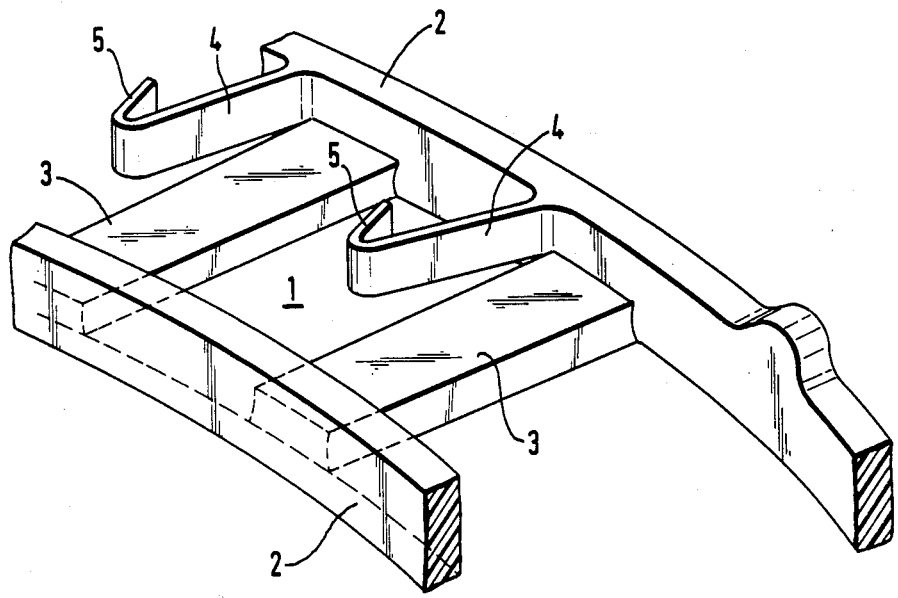

PLASTIC CAGE FOR USE IN OVERRUNNING ROLLER CLUTCHES

BACKGROUND OF THE INVENTION

The present invention relates to overrunning roller clutches. More particularly, the invention relates to improvements in retainers or cages for the clamping rollers of overrunning roller clutches It is already known to provide in an overrunning roller clutch a one-piece molded plastic cage which defines several windows or pockets for the clamping rollers. The cage has two axially spaced-apart rims and a set of axially parallel bars which connect the two rims to each other and define therewith an annulus of pockets or windows for discrete clamping rollers. Each window contains a spring which is integral with the adjacent bar and bears against the clamping roller in the neighboring window. Reference may be had to U.S. Pat. No. 3,937,312 granted Feb. 10, 1976 which discloses a cage wherein each spring is a flat piece of plastic material having one end portion integral with the corresponding bar in the region of one of the rims and a second end portion which can move toward and away from the corresponding bar and bears against the clamping roller in the respective window.

A drawback of conventional cages is that the space requirements of the springs, as considered in the circumferential direction of the cage, are substantial because the springs always extend into the corresponding windows or pockets. This renders it necessary to employ smaller clamping rollers or to reduce the overall number of clamping rollers in the clutch. In either event, the ability of the overrunning roller clutch to take up stresses is reduced which is particularly undesirable when the clutch is relatively small or very small. The ability of a small overrunning roller clutch with a small number of clamping rollers to transmit torque is unduly limited.

OBJECTS AND SUMMARY OF THE INVENTION

An object of the invention is to provide a novel and improved cage or retainer for use in overrunning roller clutches with clamping rollers wherein the number of pockets or windows for clamping rollers can be increased without adversely affecting the dimensions and/or strength of the springs and/or clamping rollers.

Another object of the invention is to provide a cage which can be made of a single piece of synthetic plastic material and wherein the springs are positioned and movable in a novel and improved way.

A further object of the invention is to provide a novel distribution of springs in the one-piece cage of an overrunning roller clutch.

An additional object of the invention is to provide a cage wherein the number of pockets or windows is relatively high even if the diameter(s) of its rim(s) is (are) small, and which can be used with advantage in large (heavy-duty), medium-sized as well as small or extremely small overrunning roller clutches.

Still another object of the invention is to provide a cage which defines a large number of discrete pockets or windows and wherein each and every clamping roller can be biased by at least one discrete springy element.

A further object of the invention is to provide the cage with novel and improved springs for clamping rollers and with novel and improved bars between the neighboring windows.

Another object of the invention is to provide a novel and improved method of distributing the bars and springs in a cage of the above outlined character.

The invention is embodied in a preferably one-piece synthetic plastic cage for the clamping rollers of an overrunning roller clutch. The cage comprises at least one annular rim, a plurality of bars extending from one side of the rim and defining therewith a plurality of windows for the clamping rollers, and a leaf spring which is provided on the rim and integral therewith for each of the bars to engage the clamping roller in the corresponding window. The springs and the bars are radially offset relative to each other so that each spring is movable circumferentially of the rim to and from a position of at least partial overlap with the adjoining bar. The thickness or radial height of each spring can equal or approximate half the radial height of the rim. The free end of each spring is provided with a spring-elastic leg for engaging the corresponding clamping roller. The leg is bent over in such a way that it extends in the opposite axial direction as the spring element.

The cage further comprises a second rim which is axially spaced apart from and is coaxial with the one rim. Each bar is integral with the second rim and the latter is or can be spaced apart from the springs.

The bars can be disposed radially inwardly of the corresponding springs.

The novel features which are considered as characteristic of the invention are set forth in particular in the appended claims. The improved cage itself, however, both as to its construction and the mode of using the same, together with additional features and advantages thereof, will be best understood upon perusal of the following detailed description of certain specific embodiments with reference to the accompanying drawing.

BRIEF DESCRIPTION OF THE DRAWING

The single FIGURE of the drawing is a fragmentary perspective view of a one-piece plastic cage with two rims which embodies one form of the present invention.

DESCRIPTION OF THE PREFERRED EMBODIMENTS

The cage which is shown in the drawing drawn to a greatly enlarged scale comprises two axially spaced-apart coaxial ring-shaped rims 2 and a plurality of equidistant bars 3 which extend between and are integral with the two rims so as to define therewith an annulus of discrete windows or pockets 1 for clamping rollers (not shown) of the overrunning roller clutch wherein the cage is put to use. The cage further comprises a discrete leaf spring for each of the bars 3, i.e., for each of the windows 1. Each spring comprises a first portion or leg 4 one end portion of which is integral with one of the rims 2, and a second portion or leg 5 one end portion of which is integral with the other end portion of the respective leg 4 and the other end portion of which is free and is spaced apart from the one rim 2 as well as from the neighboring bar 3. The free end portions of the legs 5 bear against the clamping rollers in the corresponding windows 1 of the cage. The bars 3 of the illustrated cage have constant cross-sectional areas, as considered in the axial direction of the cage, and each of the leaf springs is remote from the other (left-hand) rim 2.

In accordance with a feature of the invention, the bars 3 and the leaf springs are disposed at different distances from the axis of the cage, as considered in the radial direction of the rims 2. Thus, the illustrated cage comprises leaf springs with legs 4,5 which are disposed radially outwardly of the nearest bars 3 so that each leaf spring can bypass the corresponding bar 3, as considered in the circumferential direction of the cage. In other words, each of the two leaf springs which are shown in the drawing can be flexed so as to partially or fully overlap the respective bar 3 or that it is located radially outwardly of the corresponding window 1. The tips of the legs 5 of the leaf springs are caused to bear substantially tangentially against the clamping rollers in the corresponding windows 1 to thus ensure adequate retention and proper operation of the clamping rollers when the overrunning roller clutch embodying the illustrated cage is in actual use.

The height or thickness of each leaf spring (as considered in the radial direction of the cage) can equal or approximate half the height or thickness of the one rim 2. The combined thickness or height of a bar 3 and a leaf spring may but need not necessarily match the thickness or height of the one rim 2. The thickness or height of a bar can exceed that of a leaf spring, or vice versa.

The improved cage can employ otherwise configurated leaf springs without departing from the spirit of the invention. For example, instead of having a substantially rectangular cross-sectional outline, each of the leaf springs can have an oval, trapeziform or otherwise configurated cross-sectional outline. The same holds true for the bars 3.

An important advantage of the improved cage is that the number of windows 1 can be increased without adversely affecting the strength and/or the distribution of the springs. This is due to the fact that the springs are free to bypass the neighboring bars 3, as considered in the circumferential direction of the cage. Moreover, the cage can employ larger and more readily flexible springs. This is desirable and advantageous because the friction between the springs and the clamping rollers can be held to a minimum when the overrunning roller clutch is idle.

The aforediscussed dimensioning of the springs (so that the height or thickness of each spring equals or approximates half the thickness or height of the one race 2) has been found to be quite satisfactory because such dimensioning does not adversely influence the stability of the cage and/or springs and the flexibility of the springs is still within a highly satisfactory range.

The flexibility of substantially L- or V-shaped springs (as considered in the circumferential direction of the cage) is highly satisfactory. As mentioned above, the tips of the normally shorter second legs 5 are caused to bear against the adjacent clamping rollers when the clutch is assembled and in use.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A plastic cage for the clamping rollers of an overrunning roller clutch, comprising at least one annular rim; a plurality of bars extending from one side of the rim and defining therewith a plurality of windows for the clamping rollers; and a leaf spring provided on said rim and integral therewith for each of said bars to engage the clamping roller in the corresponding window, said springs and said bars being radially offset relative to each other so that each of said springs is movable circumferentially of the rim to and from a position of at least partial overlap with the adjoining bar, wherein said rim has a predetermined radial height, and each of said springs has a radial height which approximates or equals half said predetermined height.

2. The cage of claim 1, further comprising a second rim which is axially spaced apart from and coaxial with said one rim, said bars being integral with said second rim.

3. The cage of claim 1, wherein said bars are disposed radially inwardly of said springs.

4. A plastic cage for the clamping rollers of an overrunning roller clutch, comprising at least one annular rim; a plurality of windows for the clamping rollers; and a leaf spring provided on said rim and integral therewith for each of said bars to engage the clamping roller in the corresponding window, said springs and said bars being radially offset relative to each other so that each of said springs is movable circumferentially of the rim to and from a position of at least partial overlap with the adjoining bar, wherein said rim has a predetermined radial height, and each of said springs has a radial height which approximates or equals half said predetermined heights, and wherein each of said springs on its free end is provided with a spring-elastic leg for engaging the corresponding clamping roller, said leg being so bent over that it extends in the opposite axial direction as the spring element.

* * * * *